(No Model.) 2 Sheets—Sheet 1.

G. G. BLUNT.
GRAIN DRILL.

No. 314,993. Patented Apr. 7, 1885.

Witnesses.
Henry Frankfurter
W. S. Baker.

Inventor.
George G. Blunt.
per F. F. Warner
his Attorney.

(No Model.) 2 Sheets—Sheet 2.
G. G. BLUNT.
GRAIN DRILL.
No. 314,993. Patented Apr. 7, 1885.
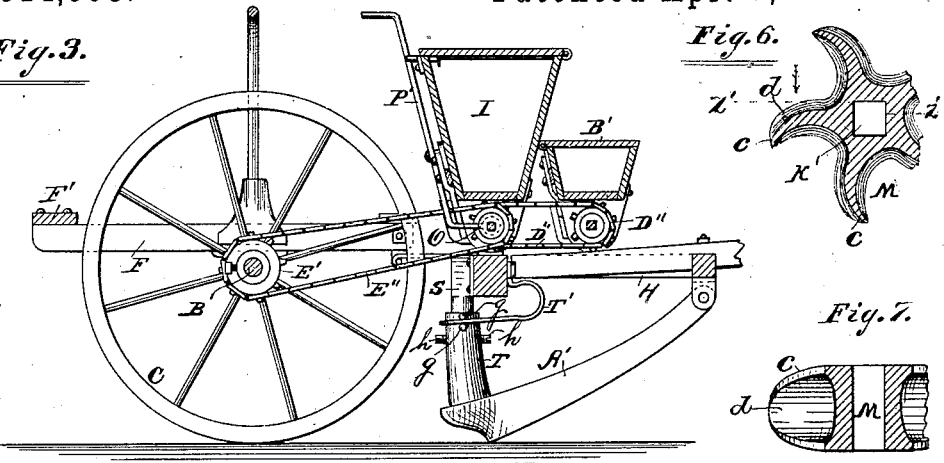
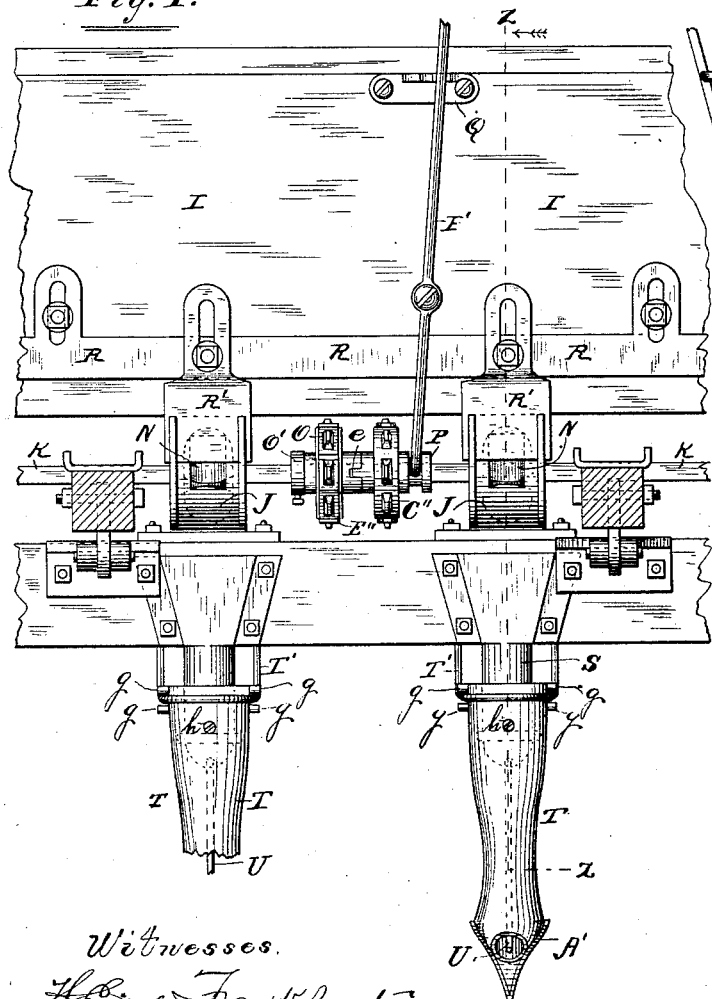
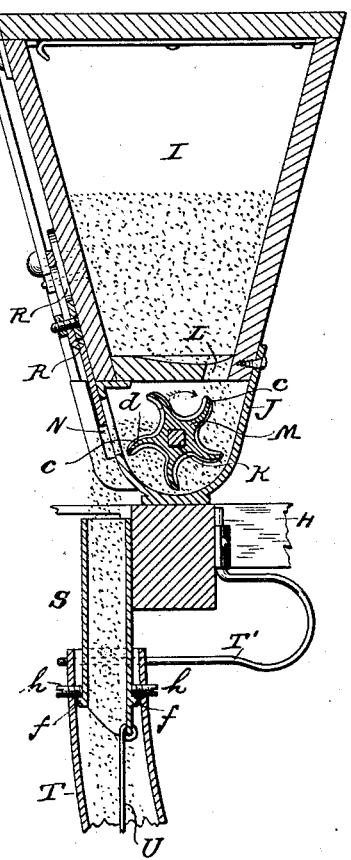
Witnesses.
Henry Frankfurter
W. S. Baker
Inventor.
George G. Blunt
per F. F. Warner
his Attorney.

UNITED STATES PATENT OFFICE.

GEORGE G. BLUNT, OF PETERSBURG, ILLINOIS.

GRAIN-DRILL.

SPECIFICATION forming part of Letters Patent No. 314,993, dated April 7, 1885.

Application filed February 23, 1884. (No model.)

*To all whom it may concern:*

Be it known that I, GEORGE G. BLUNT, residing at Petersburg, in the county of Menard and State of Illinois, have invented certain new and useful Improvements in Grain-Drills, of which the following, in connection with the accompanying drawings, is a specification.

Figure 1:
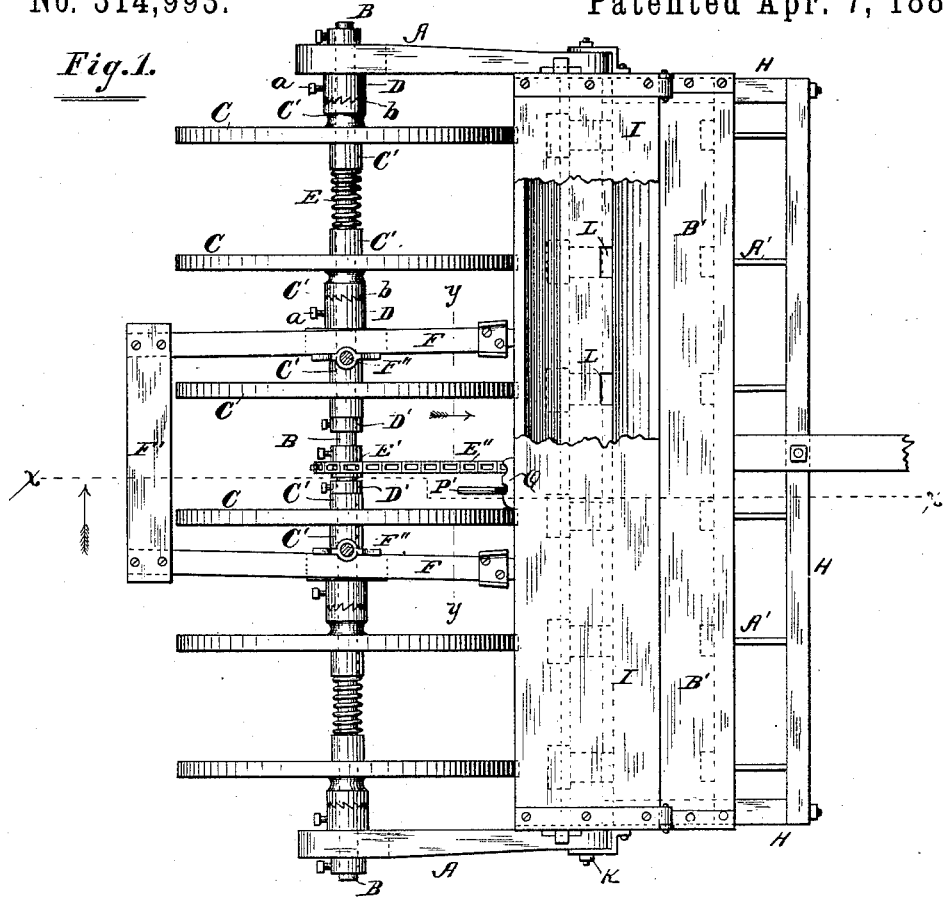
Figure 2:
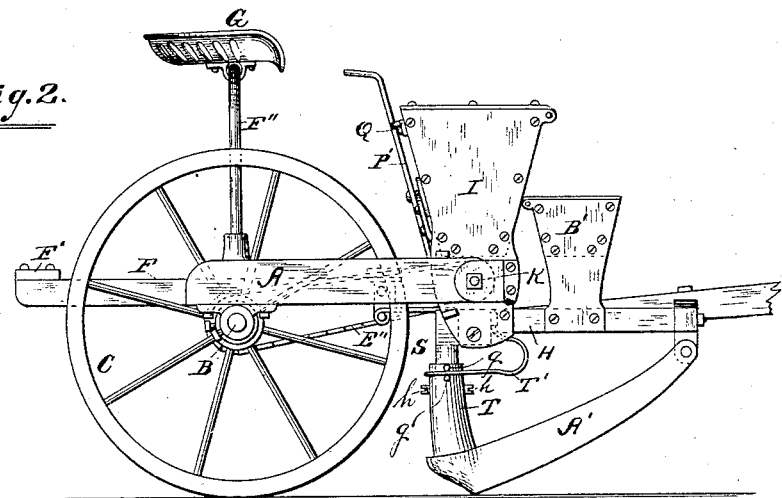

In the drawings, Figure 1 is a top view of a grain-drill embodying my improvements. Fig. 2 is a side view of the same. Fig. 3 is a section in the plane of the line $x\,x$ of Fig. 1, viewed in the direction indicated by the arrow there shown. Fig. 4 is a section in the plane of the line $y\,y$ of Fig. 1, viewed in the direction indicated by the arrow there shown. Fig. 5 is a section in the plane of the line $z\,z$ of Fig. 4, viewed in the direction indicated by the arrow there shown. Fig. 6 is a sectional detail of one of the rotary feeders and Fig. 7 is a section in the plane of the line $z'\,z'$ of Fig. 6, viewed in the direction indicated by the arrow there shown.

Like letters of reference indicate like parts.

A represents the rear or wheel frame. B is the wheel-axle turning in the said frame, and C C are the wheels, which are loosely mounted on their axle.

C' C' are the wheel-hubs, and D D are collars rigidly secured to the axle B by means of set-screws $a\,a$ or otherwise. The collars D D and the hubs of the wheels nearest thereto, respectively, are in contact, and these meeting faces are serrated, as shown at $b\,b$, and are held yieldingly together by means of springs E E, the serrations being such or so inclined that the wheels having serrated hubs will, owing to the engagement of the said hubs and collars, rotate the axle B when the implement is drawn forward, and also permit the said wheels to rotate independently of each other, or one more or less than the others when the implement moves in curved lines or on being turned. The central pair of wheels I retain in place by means of plain or unserrated collars D' D'. E' is a sprocket-wheel rigidly attached to the axle B, and E'' is a drive chain or belt on the said wheel.

F F are tilting bars or treadles supported by the axle B, and connected by means of a cross-bar, F', and F'' F''' are seat supports or standards connected to the treadles F F and supporting a seat, G. The forward ends of the treadles F F are linked or jointed to a shear-frame, H, so that the latter may be tilted by the driver, who throws his weight more or less forward or back for that purpose, as will hereinafter be more fully explained.

I do not intend herein to claim, broadly, the features of construction thus far described, some of which have heretofore been more or less nearly approached, as will be perceived, for example, on reference to Letters Patent of the United States of America No. 254,452, dated March 7, 1882, and granted to me for the improvements therein set forth.

I is the hopper or receptacle for containing the seed to be fed or drilled.

J J are the feed-boxes.

K is a square or polygonal shaft journaled in the frame A and passing through the feed-boxes.

L L are feed-openings in the bottom of the hopper or box I. An opening, L, enters each feed-box, and openings are located in the forward part of the box I, as shown.

M M are feed-wheels or feeders mounted rigidly on the shaft K and arranged in the feed-boxes. These feeders have radial arms $c\,c$, which are somewhat curved, as shown. The working or feeding faces of these arms are scooped out or made dishing, as indicated at $d$, Fig. 7, and these dishing faces are on the convexities of the said arms. The bottoms of the boxes J J are curvilineal, as is clearly indicated in Fig. 5, so as to be closely swept by the arms of the feeders as the latter are rotated.

N N are discharge-openings in the rear sides of the boxes J J.

O is a sprocket-wheel turning on a collar, O', rigidly attached to the shaft K. The belt or chain E'' runs on this wheel.

P is a clutch turning with and sliding on the shaft K, the said clutch having fingers $e\,e$, adapted and arranged to enter corresponding notches in the adjacent end of the hub of the wheel O.

P' is a lever pivoted to the rear side of the box I and entering an annular groove in the clutch P.

Q is a fixed serrated or notched plate in one or the other of the serrations of which the upper part of the lever P' rests, the said lever being flexible enough to be shifted from one to the other of the said serrations, and thereby shifting the clutch P into or out of engagement with the wheel O, and so causing the shaft K to be rotated or not from time to time, as may be desired.

R is a vertically-adjustable slide on the back of the box I, and R' R' are vertically-adjustable gates attached to the slide R. The gates R' R' are arranged to cover the openings N N; but as these gates, as well as the slide to which they are attached, are vertically adjustable, the discharge of grain from the boxes K K may be regulated with facility, and all the said gates may be adjusted simultaneously either by raising or lowering the slide R or by the independent adjustment of the gates R' R'. The hopper I and boxes J J are rigidly connected to each other, and the latter are rigidly secured to the shear-frame.

S S are rigid feed-tubes secured to the frame H rigidly, and are located to receive the seed discharged from the openings N N. On the bottoms of these tubes are small flanges or stops $ff$.

T T are supplemental feed-tubes freely surrounding the lower ends of the tubes S S. These tubes are rendered vertically yielding by means of spring-arms T' T', secured to the frame H and passing around the upper ends of the said tubes, and between lugs $g\ g$, projecting from the said tubes; but the arms T' T' may be connected to the tubes T T in any suitable or well-known way. The pressure or action of the arms T T is downward, and $h\ h$ are screws or pins entering the tubes T T at a point above the flange $f$, thereby limiting the downward movement of the said tubes.

U is a rod or comparatively stiff wire connected to the tubes S S and passing down into or through the lower ends or openings in the bottoms of the tubes T T.

A' A' are the shears, the forward ends of which are hinged to the frame H, and the heels or rear ends of which receive the lower ends of the tubes T T.

B' is a small or supplemental hopper and feed-box arranged in front of the hopper and feed-boxes already described, the said smaller box being intended for drilling comparatively small seed or grain, and the feed devices therein are substantially the same as those already described, and are driven by means of a sprocket-wheel, C'', rigidly mounted on the clutch P, and a chain, D'', passing over the said wheel and over a like wheel in the supplemental feed-box.

It will be observed that the wheels C C are arranged to follow in the trenches made by the shears.

The operation of this implement is as follows: The frame H, as will be perceived, is capable of being tilted, and this tilting movement may be regulated by the driver, who either depresses or releases the treadles F F for that purpose. By depressing the said treadles the shears A' A' are made to run with a corresponding pressure upon the soil or ground. It will also be perceived that the shears A' A' have an independent rising and falling movement, which movement is also rendered yielding by reason of the action of the spring-arms T' T', consequently the shears yield to uneven ground and to obstructions, although their downward pressure is regulated chiefly by the driver. The grain is fed or pushed out of the openings in the feed-boxes by means of the feeds M M, which, being constructed in the manner shown and described, operate somewhat like scoops. The discharge of the grain is regulated either by means of the adjustable slide R or the adjustable gates R' R', or by both, as may be desirable or necessary. The rods U U tend to keep the mouths or discharge-openings open, or prevent them from becoming clogged. The means employed for rotating the feed-shaft permit me to throw it in and out of gear with the driving-gear with facility. It will also be perceived that by turning in the screws $h\ h$ sufficiently the tubes S and T will be clamped rigidly together, and the latter tubes may thus be set either higher or lower, as may be desired.

Having thus described my invention, what I claim as new, and desire to secure by Letters Patent, is—

1. The combination, in a grain-drill, of the frame H, the rigid tubes S S, attached rigidly to the said frame, and having on their lower ends the stops or flanges $ff$, the tubes T T, entered by the tubes S S, and having therein the screws $h\ h$, located above the said flanges, and having thereon the lugs $g\ g$, the springs T' T', attached to the said frame and passing between the said lugs, and the hinged shears A' A', attached to the tubes T T, substantially as and for the purposes specified.

2. The combination, in a grain-drill, of the fixed and rigid tubes S S, having the stops or flanges $ff$ on their lower ends, the vertically-yielding tubes T T, having the screws $h\ h$ located thereon above the said flanges, and arranged for contact therewith when the tubes T T are in their lowest position, and the hinged shears A' A', attached to the tubes T T, substantially as and for the purposes specified.

3. The combination, in a grain-drill, of the fixed and rigid feed-tubes S S, the vertically-movable tubes T T, having thereon the outwardly-projecting lugs $g\ g$, located near the upper ends of the said tubes, the spring-arms T' T', secured to the frame H, and passing around the upper ends of the tubes T T and between the said lugs, substantially as and for the purposes set forth.

In testimony that I claim the foregoing as my own I hereto affix my signature in presence of two witnesses.

GEO. G. BLUNT.

Witnesses:
 OLIVER B. CARTER,
 EDGAR R. THOMPSON.